April 4, 1967   D. L. DAVENPORT   3,312,484
TOGGLE RING TUBE COUPLING
Filed Oct. 31, 1960

INVENTOR.
DAVID L. DAVENPORT

ATTORNEYS

United States Patent Office 3,312,484
Patented Apr. 4, 1967

3,312,484
TOGGLE RING TUBE COUPLING
David L. Davenport, Hudson, Ohio, assignor to D & G
Plastics Co., Kent, Ohio, a corporation of Ohio
Filed Oct. 31, 1960, Ser. No. 66,014
4 Claims. (Cl. 285—340)

This invention relates to an improvement in toggle ring type tube couplings. It is particularly adapted for use in conjunction with tubing of relatively soft material, such as a thermoplastic which may be subject to deformation when a sharp continued force is imposed thereupon.

The principles of the invention are, of course, applicable for use in connection with certain types of metallic tubing. The coupling of this invention is intended for use in connection with plain end tubing.

An important object of this invention is to provide a new and improved toggle ring type coupling which avoids the need for having an internal groove within the coupling which would require machining and one in which the components of the coupling are so designed that they can be readily molded or die cast.

A second object of the invention is to provide an improved coupling incorporating a toggle ring which is axially separated from an O-ring seal by means of a thrust spacer ring to provide improved sealing and gripping characteristics.

A further object of the invention is to provide a coupling including an annular resilient seal so proportioned relative to the groove within which it is received as to be deformed into tight engagement with the surface of the tubing to be coupled conforming to all of the irregularities thereof when the coupling is made up.

Still another object of the invention is the provision of a coupling of the type described in which the tubing may be swiveled relative to the coupling without the efficiency of the seal being impaired during swiveling operation.

Still a further object of the invention is the provision of a coupling which may be both readily assembled and disassembled and which is economical to manufacture and simple in design.

A further object of the invention is the provision of a coupling wherein the sealing element is so positioned within the coupling that a practical and efficient sealing upon the tube can be achieved even though the tube end is not fully inserted into the coupling.

Still a further object is the provision of a coupling in which a toggle ring is clamped firmly between the coupling nut and the thrust spacer ring to prevent the coupling action of the assembly from being impaired due to displacement of the toggle ring.

To the accomplishment of the foregoing and related ends, said invention then consists of the means hereinafter fully described and particularly pointed out in the claims; the following description setting forth in detail one approved means of carrying out the invention, such disclosed means, however, constituting but one of the various ways in which the principles of the invention may be used.

Figure 1:
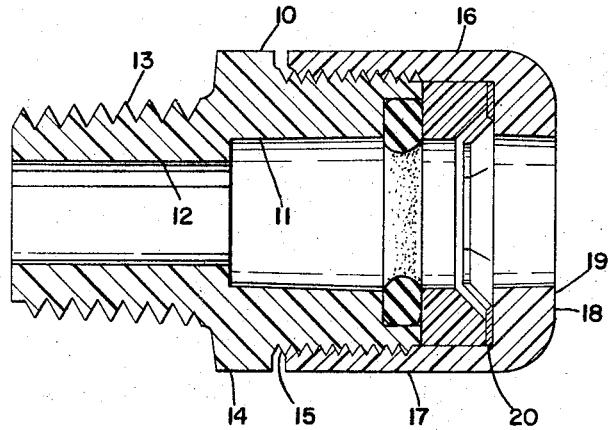
FIG. 1 is a longitudinal, cross-sectional view of my new and improved coupling.
Figure 2:
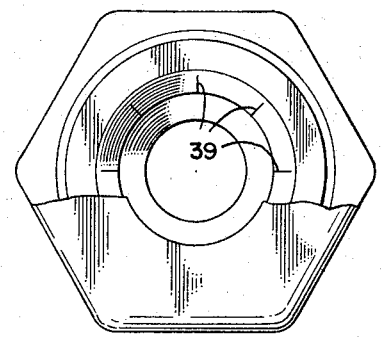
FIG. 2 is a fragmentary end view of the coupling shown with part of the coupling being broken away.
Figure 3:
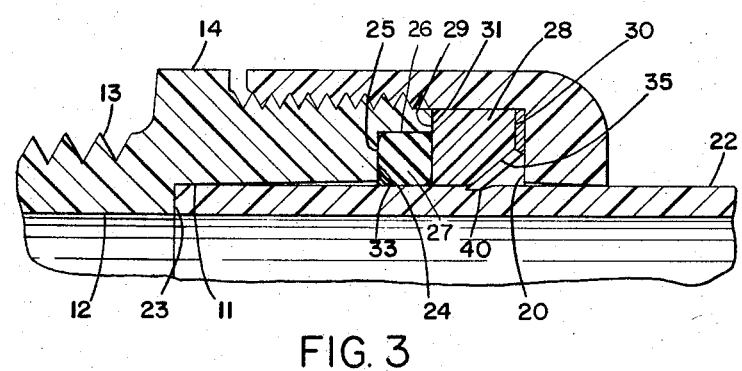
FIG. 3 is a fragmentary cross-sectional view showing the coupling assembled on a tube and illustrating the assembled relationship of the body, coupling, O-ring, thrust spacer ring and toggle ring.
Figure 4:
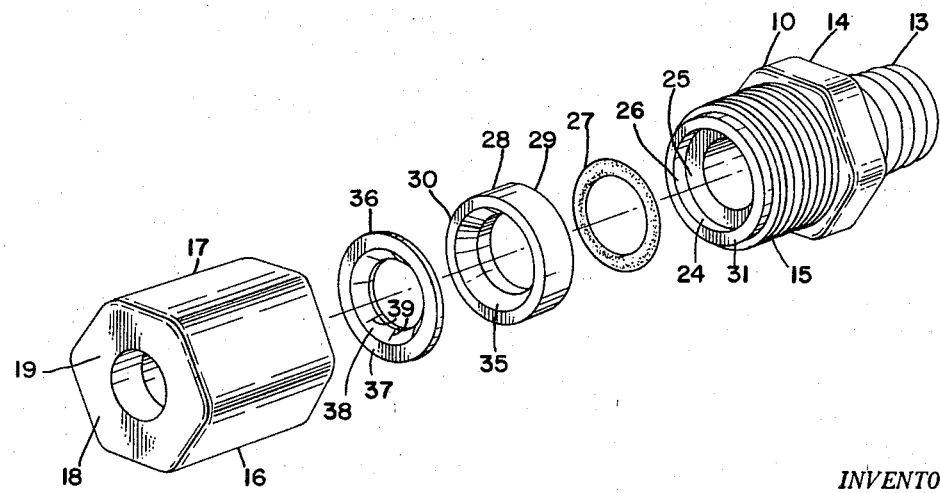
FIG. 4 is an exploded perspective view in reduced scale of the coupling.

Referring now more particularly to the drawings, there is shown a coupling body 10 having tool pads or wrench engaging surfaces 14 and being threaded at rearward end 13 for attachment with another threaded member. Within the coupling is provided an axial bore 12 including a first coaxial counterbore 11 and a second coaxial counterbore 24. The counterbore 11 constitutes an enlarged portion of the bore 12 and is connected to the rearward portion thereof by means of a radial shoulder 23.

The second counterbore comprising an annular cylindrical surface 26 is connected to the said first counterbore surface 11 by means of a radial extending shoulder 25. This annular surface 26 joins a flat annular end surface 31 of the coupling body and is generally perpendicular thereto.

The forward end of the coupling body is threaded as at 15 and is adapted to be engaged with a complementary threaded screw thimble coupling nut 16. It will be appreciated, of course, that as an alternative structure a gland type could also be used.

The nut 16 is shown to be hexagonally shaped and has tool pads 17 to aid in the assembly or disassembly of the thimble of a coupling body. At the free end 19 of the thimble 16 is a radially inwardly extending annular flange 18 of sufficient thickness to resist shear under forces that might tend to withdraw a tube from the coupling in operation. The flange 18 forms an internal shoulder 20 lying in a plane generally perpendicular to the axis of the fitting. Intermediate the shoulder 20 and the internal threaded portion of the thimble is an annular cylindrical surface of a diameter proportioned to fit snugly about a thrust spacer ring 28.

The thrust spacer 28 which is preferably of the same material as the coupling body and thimble and has substantially opposed surfaces on the body side 29 and thimble side 30. The generally flat body opposed annular surface or wall 29 is adapted to engage at its radially outward periphery tightly against end surface 31 of the body. The balance of annular surface 29 of the thrust spacer forms with surfaces 25 and 26 of the second counterbore 24 a seal ring receiving groove adapted to receive an annular sealing element shown here as O-ring 27.

The annular sealing element 27 is preferably made up of a resilient elastomer material and when placed within the counterbore 24 in unstressed position before the parts of the coupling are assembled, it has approximately 30 percent of its radial thickness extending into the counterbore 11 before the coupling is hand tightened. Moreover, the O-ring in the unstressed condition extends approximately the same amount axially beyond the end surface 31 of the coupling body. It will thus be appreciated that the O-ring in this unstressed condition has a volume greater than the volume of the O-ring receiving groove when the thrust ring 28 is tightly engaged with end surface 31.

On that portion of the thrust spacer ring opposed to the flange 18 of the thimble is a flat surface 30 generally parallel to the annular surface 29. The thrust spacer ring 28 is provided with a central axially extending bore of substantially the same diameter as that of the counterbore 11 and of the the flange 18 of the thimble. At the forward end of the bore of the ring there is a flared mouth which may be formed on an angle of about 46° to the axis of the ring although a few degrees variation on either side is satisfactory.

It will be noted that the flared mouth 35 converges toward the rearward end of the coupling body and also joins the surface 30 of the ring. A spring steel toggle type gripping element 36 is disposed within the thimble in a position to be tightly clamped between the surface 20 of the flange 18 and the surface 30 of the thrust spacer ring 28. The toggle ring is provided with an external diameter of a size to fit snugly within the internal cavity of the thimble 16.

The toggle ring 36 is provided with a radially extending flat peripheral annular portion 37 lying generally within a plane perpendicular to the axis of the coupling. Extending from the flat annular portion of the toggle ring is a frusto-conical portion which converges toward the thrust spacer ring in substantially the same direction as the flared mouth thereof. The frusto-conical portion of the toggle ring is formed with a plurality of tines which are preferably equal in width. The side edges of the tines begin approximately at the junction between the flat annular portion of the ring and the frusto-conical portion.

The tines 39 have at their inner ends sharp edges and together form a circular, central opening, the diameter of which when the tines are unstressed is somewhat smaller than the external diameter of the tube to be coupled.

It should be pointed out that the radial extent of the surface 30 of the thrust spacer ring should be less than the radial extent of the flat annular portion 37 of the toggle ring so as to provide a space between the surface 31 of the flared mouth of the thrust ring and the opposed frusto-conical surface 38 of the toggle. This space provides an accommodation for the flexure of the tines as they are expanded radially by reason of the insertion of the tubing. If it were not for this space there would be no room for this expansion to take place. In practice, the magnitude of the space provided is somewhat greater than the thickness of the frusto-conical portion.

Other features should be pointed out in connection with the improved coupling, one of which is the fact that the inner diameter of the tubing and the smallest portion of the bore 12 of the coupling are approximately the same so that there will be no restriction of the flow of fluids through the coupling.

Another significant advantage is the disposition of the sealing ring 27 substantially forward of the radial cross shoulder 23 of the coupling body to the mouth of the fitting so that as the tube is inserted in the fitting, sealing action can take place almost immediately and the seal is provided even though the tube is not fully seated in the coupling body.

The operation of the fitting described above will be readily apparent. First, the elements of a coupling are assembled in the order shown in the exploded view and tightened somewhat but not to the point that substantial compression of the O-ring has been effected. A tube having an outer diameter slightly greater than the diameter of the opening of the toggle ring is inserted therein. Sometimes insertion is faciliated by a twisting or rotating action of the tubing in the coupling. As the tube is inserted the tines spread into the space provided for so that the tube can pass into the coupling and bottom on the radial shoulder 23. When insertion has been completed, the thimble is tightened upon the coupling body until the annular surface at the rearward end of the thrust spacer ring is brought into contact with the end surface 31 of the coupling body. The axial movement of the thimble against the toggle ring and, in turn, upon the thrust spacer ring compresses O-ring 27 tightly within the confines of the seal ring receiving groove. The substantial compression thus brought about in O-ring 27 causes the inner surface of the tubing to flow into the irregularities or deformations that may exist on the tubing, and to bring about an effective seal as at 33. The sealing action of the O-ring is of particular importance in the type of coupling here involved because the tines of the toggle ring inevitably tend to scratch or otherwise bring about minute irregularities or deformations on the surface of the tubing as it is inserted therein. This is particularly important when the tubing is of relatively soft material and easily susceptible to scratching.

It will be understood that once the tube has been inserted through the toggle ring, the tines will have a tendency to resume their original unstressed position thereby pressing against and into the surface of the tube to grip the same firmly within the coupling. Upon the application of a sustained force of withdrawal on the tube, the tines will tend to flex into the plane of the flat annular portion 37 of the toggle ring thereby reducing the diameter of the central opening in such ring to cause the tines to bite into the tube surface and increase the gripping action.

It will be apparent from the description of the fitting set forth above that the design here provided avoids the necessity of having to machine on an internal surface of the coupling body a groove into which a sealing element may be inserted. The significance of this feature will be apparent to those who recognize the economic impact of a fitting involving internal machine grooves. Obviously, this fitting may be in its entirety molded or die cast.

Of additional significance is the fact that since the sharp ends of the tines cut thereon a groove in the deformable surface of the tubing into which they engage, the tubing may be swiveled or rotated within the coupling without the gripping pressure being relinquished, or without any impairment of the seal. Inasmuch as the seal is under constant compression by reason of its confinement in the seal ring, it will readily accommodate itself to the varying contours of the external surface of the tube as the tube is rotated within the coupling thereby providing a positive and efficient sealing action regardless of the disposition of the tube relative to the coupling.

Another advantage possessed by this improved coupling is that it can be taken apart and re-used. In the event that the toggle ring cannot be removed from the tubing upon which it has been located, either the ring or the tube can be cut and a new component can be utilized in a subsequent assembly.

In connection with the nature of the effective grip upon the tubing, it should be stressed that the toggle ring is clamped tightly between the flange of the thimble and the surface 31 of the body so that it cannot be translated redially or axially when the coupling is assembled.

Although the present invention has been described in connection with a few preferred embodiments thereof, variations and modifications may be resorted to by those skilled in the art without departing from the principles of the invention. All of these variations and modifications are considered to be within the true spirit and scope of the present invention as disclosed in the foregoing description and defined by the appended claims.

I claim:

1. A coupling unit for use with tubular conduit or the like comprising a coupling body having a partially threaded cylindrical exterior, a central bore and a larger diameter counterbore concentric therewith and joined thereto by a radially extending annular wall at one end of said body; a resilient, compressible seal member disposed within and filling said counterbore, said seal having a relaxed cross sectional volume greater than the cross sectional volume defined by said wall and said counterbore; an apertured cap in threaded engagement with the coupling body; an apertured ring having a central frusto-conical surface housed within said cap; a cylindrical thrust member also housed within said cap, said thrust member having one end in engagement with said sealing member and one end in engagement with said ring, said ring and that end of the thrust member in engagement therewith including outer, annular, plane surfaces in concentric relation, said thrust member further including, at the end in engagement with said ring, a frusto-conical surface to accommodate the central frusto-conical surface of said ring, the position of the latter surface being displaced from the position of the former surface whereby the central surface of said ring is spaced from the central surface of said spacer to permit flexure of the frusto-conical surface of said ring inwardly toward the coupling body, the frusto-conical surface of the ring being flexibly yieldable and terminating in a circular gripping edge having a diameter closely approximating the diameter of the outer surface of the conduit to be coupled to facilitate insertion of the end of a conduit or the like into said coupling body through said cap, said ring and said cylindrical spacer by flexure of said frusto-conical surface and to prevent removal of said conduit by penetrating contact of the gripping edge of said ring with the exterior of said conduit, said cap including an annular wall surrounding the aperture therein and engaging the flat annular periphery of said ring, said thrust member and said seal in assembled concentric relation with respect to the coupling body whereby as said cap is rotated on said coupling body axial movement thereof is transmitted through said ring and said spacer to compress said seal member against the outer surface of the conduit.

2. A reusable coupling as defined in claim 1 characterized in that the seal is a ring member having a relaxed cross-sectional volume 30% greater than the volume of the groove formed by the diametric annular wall, the counterbore and said flat end of the spacer element.

3. A reusable coupling as defined in claim 1 wherein the flat outer annular surface of said spacer end has a diametric width less than that of the flat annular surface will bounding the frusto-conical portion of the locking ring whereby the frusto-conical portion of said ring may flex freely at all times toward the coupling body to permit easy insertion of a conduit therein.

4. A coupling unit as defined in claim 1, wherein the ring is formed of a metal having the resilience and strength characteristcs of spring steel.

References Cited by the Examiner
UNITED STATES PATENTS

| | | | |
|---|---|---|---|
| 470,531 | 3/1892 | Aims | 285—345 |
| 2,284,365 | 5/1942 | Briegel | 285—340 |
| 2,444,380 | 6/1948 | Shinek | 285—340 |
| 2,452,278 | 10/1948 | Woodling | 285—348 |
| 2,466,526 | 4/1949 | Wolfram | 285—382.7 |
| 2,484,192 | 10/1949 | Squiller | 285—382.7 |
| 2,999,701 | 9/1961 | Blair et al. | 285—340 |

FOREIGN PATENTS

| | | |
|---|---|---|
| 863,881 | 3/1952 | Germany. |

CARL W. TOMLIN, *Primary Examiner.*

D. W. AROLA, S. R. MILLER, A. R. JUHASZ, H. C. BOURNE, *Assistant Examiners.*